United States Patent [19]

Novis et al.

[11] Patent Number: 5,728,998
[45] Date of Patent: Mar. 17, 1998

[54] SECURE SMART CARD READER WITH VIRTUAL IMAGE DISPLAY AND PULL-DOWN OPTIONS

[75] Inventors: Scott R. Novis, Tempe; Karen E. Jachimowicz, Laveen; Dennis Barry, Phoenix, all of Ariz.; Jack Van Zile, Lake Worth, Fla.; George W. Rhyne, Cary, N.C.

[73] Assignee: Motorola, Inc., Schaumburg, Ill.

[21] Appl. No.: 625,654

[22] Filed: Mar. 29, 1996

[51] Int. Cl.$^6$ ........................................... G06K 5/00
[52] U.S. Cl. .................... 235/380; 235/454; 235/457; 235/492; 235/375; 359/630; 345/7
[58] Field of Search ........................... 235/380, 472, 235/441, 454, 487, 492, 375, 457; 359/802, 803, 630; 345/7, 8, 32

[56] References Cited

U.S. PATENT DOCUMENTS

| | | | |
|---|---|---|---|
| 4,672,182 | 6/1987 | Hirokawa | 235/492 X |
| 4,709,136 | 11/1987 | Watanabe | 235/379 |
| 4,774,399 | 9/1988 | Fujita et al. | 235/441 |
| 4,843,223 | 6/1989 | Shino | 235/441 X |
| 4,900,905 | 2/1990 | Pusic | 235/381 |
| 5,015,830 | 5/1991 | Masuzawa et al. | 235/441 |
| 5,025,386 | 6/1991 | Pusic | 364/478 |
| 5,070,233 | 12/1991 | Takizawa et al. | 235/380 |
| 5,144,115 | 9/1992 | Yoshida | 235/379 |
| 5,224,198 | 6/1993 | Jachimowicz et al. | 385/133 |
| 5,252,815 | 10/1993 | Pernet | 235/441 |
| 5,272,319 | 12/1993 | Rey | 235/441 X |
| 5,325,429 | 6/1994 | Kurgan | 235/441 X |
| 5,410,138 | 4/1995 | Martin | 235/472 X |
| 5,461,222 | 10/1995 | Haneda | 235/492 |
| 5,517,011 | 5/1996 | Vandenengel | 235/492 X |
| 5,532,466 | 7/1996 | Konno et al. | 235/472 X |
| 5,602,742 | 2/1997 | Solondz et al. | 364/464.2 |
| 5,604,640 | 2/1997 | Zipf et al. | 235/380 X |
| 5,623,547 | 4/1997 | Jones et al. | 235/379 X |

FOREIGN PATENT DOCUMENTS 61-147386 7/1986 Japan.
63-245582 10/1988 Japan.

*Primary Examiner*—Donald T. Hajec
*Assistant Examiner*—Michael G. Lee
*Attorney, Agent, or Firm*—Eugene A. Parsons

[57] ABSTRACT

A smart card reader including a portable housing with a viewing aperture and a virtual image display positioned to provide an image at the aperture. A sensor in the housing constructed to have a smart card with data stored thereon positioned adjacent thereto in data sensing juxtaposition and electronics mounted in the housing and connected to the sensor for receiving sensed data and further connected to the virtual image display for supplying image data thereto.

7 Claims, 4 Drawing Sheets

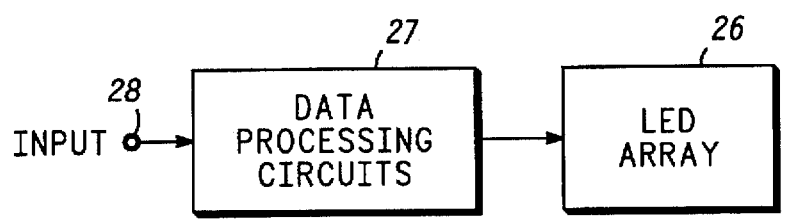
FIG. 4
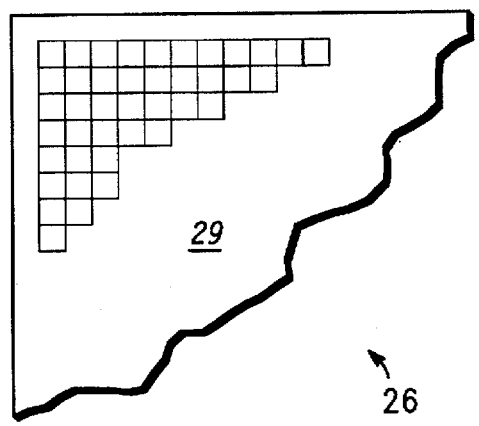
FIG. 5
FIG. 10
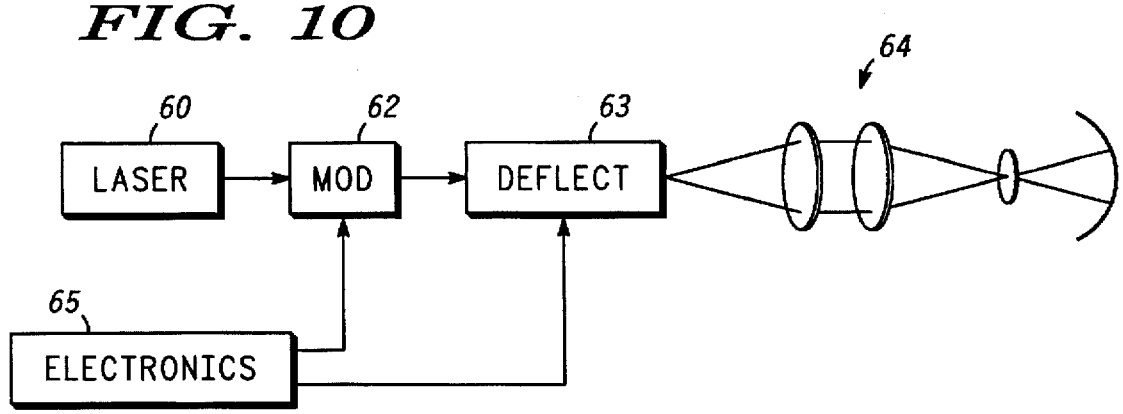

SECURE SMART CARD READER WITH VIRTUAL IMAGE DISPLAY AND PULL-DOWN OPTIONS

FIELD OF THE INVENTION

The present invention pertains to portable apparatus for reading a smart card.

BACKGROUND OF THE INVENTION

Smart cards are becoming very popular around the world. Generally a smart card is defined as a card (similar in size to a common credit card) containing a semiconductor chip with some electronics and a memory for storing information. Smart cards are used to store personal information, ranging from medical information to financial data. The large amount of information, or data, stored on a smart card is not generally accessible, even to the owner. Also, various different smart cards are presently in use, including those that operate at a variety of different voltages and those that can be accessed by electrical contacts, contactless cards, optically readable cards, magnetically readable cards, etc. It is desirable, therefore, to provide means whereby the owner can view the stored information on the card to determine the status.

It is a purpose of the present invention to provide new and improved apparatus for viewing information stored on a smart card.

It is another purpose of the present invention to provide new and improved apparatus for viewing information stored on a smart card, which apparatus can be standardized to receive virtually any of the multiple types of smart cards.

It is still another purpose of the present invention to provide new and improved apparatus for viewing information stored on a smart card, which apparatus contains safe features to prevent unwarranted viewing of the information.

It is a further purpose of the present invention to provide new and improved apparatus for viewing information stored on a smart card, which apparatus is portable and easy to operate.

SUMMARY OF THE INVENTION

The above problems and others are at least partially solved and the above purposes and others are realized in a smart card reader including a portable housing with a viewing aperture and a virtual image display positioned in the housing to provide an image for viewing at the viewing aperture. The virtual image display also includes a data input terminal designed to receive image data thereon. A sensor structure is mounted in the housing and constructed to have a smart card with data stored thereon positioned adjacent thereto in data sensing juxtaposition. The sensor structure includes an output terminal having sensed data thereon. Electronics are mounted in the housing and connected to the output terminal of the sensor structure for receiving the sensed data and are further connected to the input terminal of the virtual image display for supplying image data thereto in response to the sensed data.

BRIEF DESCRIPTION OF THE DRAWINGS

Referring to the drawings:

FIG. 4 is a simplified block diagram of a portion of the portable smart card reader of FIG. 1;

FIG. 5 is a view in top plan of a portion of the apparatus of FIG. 4;

FIG. 10 is a block diagram of another visual display for the portable smart card reader of FIG. 1;

DESCRIPTION OF THE PREFERRED EMBODIMENTS

Figure 1:
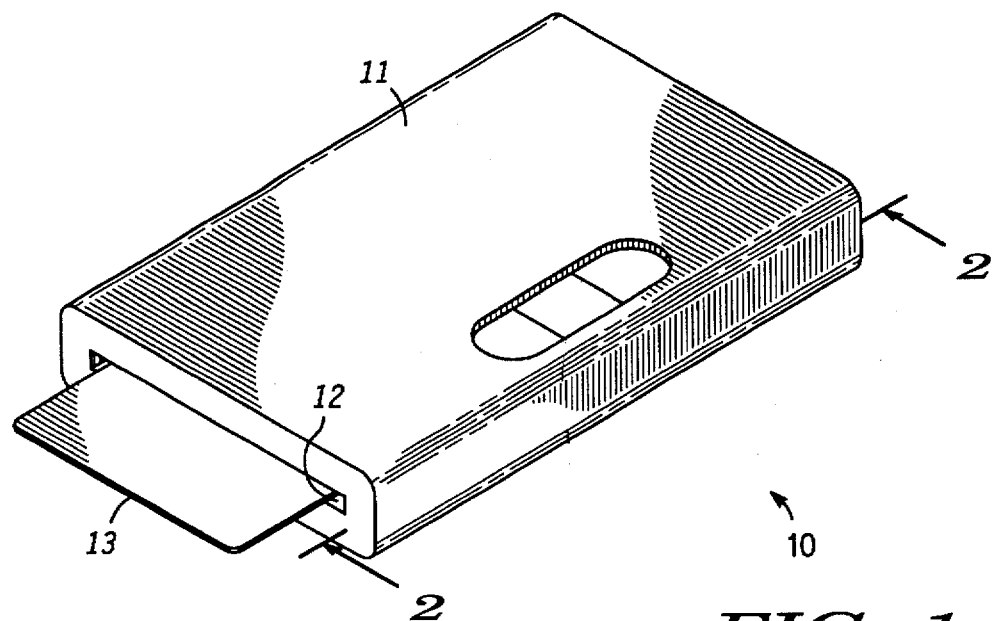
FIG. 1 is an isometric view of a portable smart card reader in accordance with the present invention.
Figure 2:
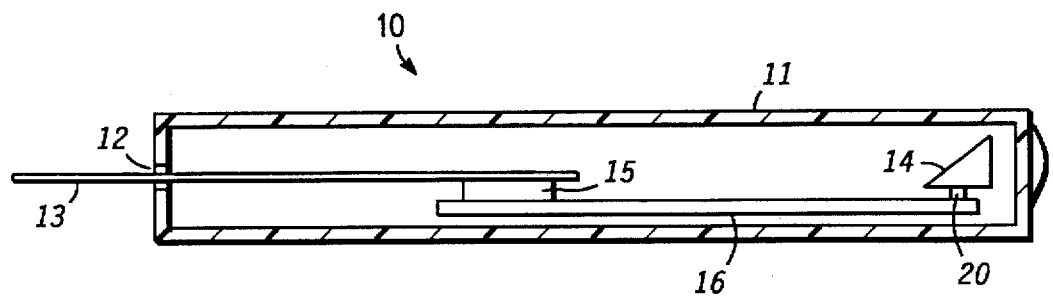
FIG. 2 is a simplified sectional view as seen along the line 2—2 of FIG. 1.

Turning now to the drawings, FIGS. 1 and 2 illustrate a specific embodiment of a smart card reader 10 in accordance with the present invention. Smart card reader 10 includes a portable housing 11 which is ergonomically designed to be handheld, that is housing 11 is formed to conveniently fit the hand and allow comfortable use of the controls and to operate the device. Housing 11 also includes a slot 12 for receiving a smart card 13 therein and allowing the sensing of information stored on smart card 13. Slot 12 is designed to place smart card 13 adjacent to sensor structure 15 mounted in housing 10 in data sensing juxtaposition. It will of course be understood that while slot 12 is preferable for correctly positioning smart card 13, other structure might be utilized, including simply placing smart card 13 adjacent to sensor structure that is externally accessible.

Housing 11 also has a visual display 14 mounted therein for providing a visual image of the information stored on smart card 13. Electronics 16 are mounted in housing 10 in electrical communication with sensor structure 15, which in this specific embodiment are illustrated as being mounted directly on a circuit board containing and interconnecting electronics 16 and sensor structure 15. The circuit board containing electronics 16 is also positioned to have mounted thereon and electrically connected to electronics 16 apparatus 20 including a two dimensional array of light emitting devices connected to provide a complete real image in visual display 14. Generally, electronics 16 include a central processing unit (CPU) and memory (RAM or ROM) capable of working with the CPU and visual display 14.

In a preferred embodiment, sensor structure 15 is constructed to physically engage external electrical contacts on smart card 13 so that smart card 13 is directly connected to the CPU in electronics 16. The CPU is programmed to interface with the memory and circuitry on smart card 13 and provide the information stored on smart card 13 to visual display 14 in the form of image data. Visual display 14 then generates an image (or images) of the sensed data from smart card 13. It will be understood that sensor structure 15 can include optical sensors, magnetic sensors, and/or electronic sensors in addition to or instead of physically engaging electrical contacts. It should also be understood that in some specific instances a certain amount of communication with the electronics on the smart card may be desired or even necessary (security issues to be discussed presently) and, in these instances, sensor structure 15 is constructed to communicate information to smart card 13 from the CPU, as well as communicating information from the smart card to the CPU.

Figure 3:
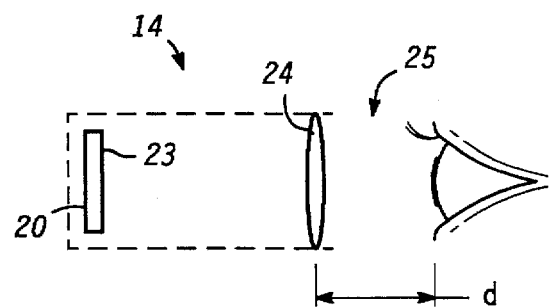
FIG. 3 is a simplified schematic view of a portion of the portable smart card reader of FIG. 1.

Referring specifically to FIG. 3, an example of visual display 14 is illustrated in a simplified schematic view. Display 14 includes apparatus 20 for providing an image on a surface 23. An optical system, represented by lens 24, is positioned in spaced relation to surface 23 of apparatus 20 and produces a virtual image viewable by an eye spaced from an aperture 25 defined by lens 24.

Apparatus 20 is illustrated in more detail in FIG. 4 and includes, for example, semiconductor electronics such as a light emitting device (LED) array 26 driven by data processing circuits 27. Data processing circuits 27 include, for example, logic and switching circuit arrays for controlling each LED in LED array 26. Data processing circuits 27 include, in addition to or instead of the logic and switching arrays, a microprocessor or similar circuitry for processing input signals of software instructions to produce a desired image on a device such as LED array 26. It will be understood that data processing circuits 27 and LED array 26, while illustrated separately for purposes of this description, could be formed on the same semiconductor chip in some applications.

In this specific embodiment LED array 26 includes light emitting diodes which are utilized because of the extremely small size that can be achieved and because of the simplicity of construction and operation. It will of course be understood that other image generating devices may be utilized, including but not limited to lasers (such as vertical cavity surface emitting lasers), LCDs, organic light emitting diodes, etc. Referring specifically to FIG. 5, a plan view of LED array 26 is illustrated in which the LEDs are formed in a regular pattern of rows and columns on a single substrate 29, which in this embodiment is a semiconductor chip. Portions of substrate 29 are broken away to simplify the drawing but it should be understood that many of the other circuits, and especially drivers, could be included on the same substrate. By addressing specific LEDs by row and column in a well known manner, the specific LEDs are energized to produce an image or images. Digital or analog data is received at input terminal 28 and converted by data processing circuits 27 into signals capable of energizing selected LEDs to generate the predetermined image.

It will be understood by those skilled in the art that LED array 26 and substrate 29 are greatly enlarged in the figures. The actual size of substrate 29 is on the order of a few milli-meters along each side, with the light emitting area or array being generally in the range of 2 to 50 milli-meters and preferably 5 to 10 milli-meters, with each LED being less than 20 microns on each side and preferably on the order of as little as one micron on a side. It should be understood that the actual light emitting device array is much smaller, because bonding pads, etc. add several milli-meters of area on each side. Generally, the larger size substrates or chips simply mean that more light emitting devices are used in the array to provide more definition, color, etc. As the semiconductor technology reduces the size of the chip, greater magnification and smaller lens systems are required. Reducing the size of the lenses while increasing the magnification results in greatly limiting the field of view, substantially reducing eye relief and reducing the working distance 'd' of the lens system.

The lens system, represented schematically by lens 24, is mounted in spaced relation from surface 23 of apparatus 20 so as to receive the image from surface 23, magnify it a predetermined amount and create the aperture within which the virtual image is viewed. In the present embodiment, lens 24 magnifies the image fifteen times (15×) so that the image from LED array 26 is magnified fifteen times its original angular size. Generally, a magnification of at least ten is required to magnify the real image sufficiently to be perceived by a human eye. It will of course be understood that the lens system may be adjustable for focus and additional magnification, if desired, or may be fixed in housing 11 for simplicity.

Figure 6:
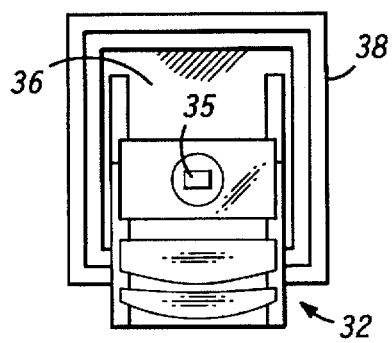
FIGS. 6, 7 and 8 are top front and side views of a portion of the portable smart card reader of FIG. 1.
Figure 7:
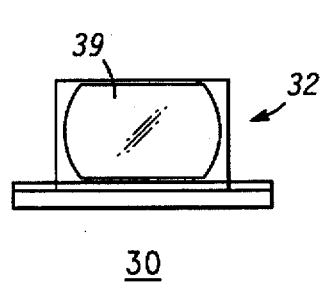
Figure 8:
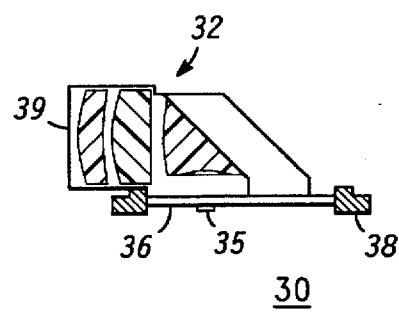

FIGS. 6, 7 and 8 illustrate a top plan view, front view, and side elevation, respectively, of a miniature virtual image display 30 which, in a preferred embodiment, is used as visual display 14 in smart card reader 10. Miniature virtual image display 30 incorporates a single fold optical magnifier 32. FIGS. 6, 7 and 8 illustrate miniature virtual image display 30 approximately the actual size to provide some indication as to the extent of the reduction in size achieved by the apparatus. Display 30 includes real image generating apparatus 35 with an array of light emitting devices, such as organic or inorganic light emitting diodes, field emission devices, vertical cavity surface emitting lasers, LCDs, etc. In this specific embodiment, apparatus 35 includes 144 light emitting devices by 240 light emitting devices. Each light emitting device is fabricated approximately 20 microns on a side with a center-to-center spacing between adjacent devices of no more than 20 microns. Each light emitting device is turned ON with approximately 1.8 volts and utilizes approximately 50 µA of current when it is turned ON. Apparatus 35 produces a luminance less than approximately 15 fL.

Apparatus 35 is mounted on the under-surface of a glass substrate 36 and a driver board 38 is bump-bonded to substrate 36. Additional information on driver boards and bonding of substrates to the driver boards is disclosed in U.S. Pat. No. 5,432,358, entitled "Integrated Electro-optical Package", issued Jul. 11, 1995 and assigned to the same assignee, which information is included herein by reference.

Single fold optical magnifier 32 is also mounted on substrate 36 and includes a plurality of optical elements defining a light path from apparatus 35 to a viewing aperture 39, best seen in FIG. 7. The plurality of optical elements are constructed to angularly magnify images, generated by apparatus 35, at a light inlet of a first optical element by greater than ten. Because of the length of the optical path and the size of apparatus 35 (the image source), the horizontal field of view of the optics ranges from approximately 11 degrees at a magnification of 10× to 22 degrees at a magnification of 20×, with the present embodiment having a horizontal field of view of approximately 16 degrees and a magnification of 15×.

Figure 9:
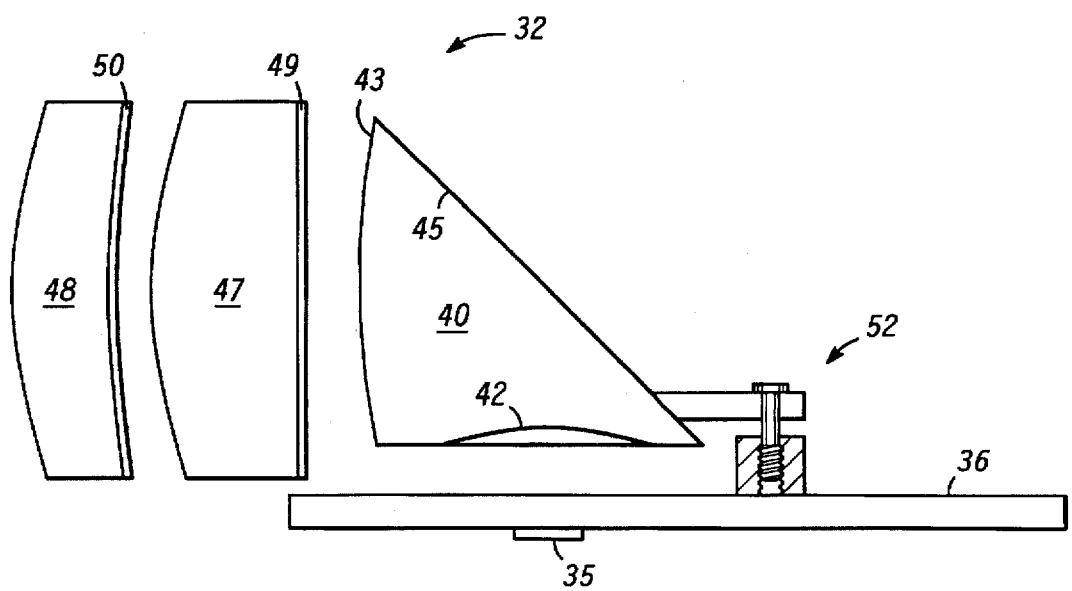
FIG. 9 is an enlarged side view of the apparatus of FIG. 6.

Referring specifically to FIG. 9, a 4× magnified view in side elevation of portions of display 30 of FIG. 6 is illustrated for clarity. From this view it can be seen that the plurality of optical elements includes a first optical element 40 having a light inlet 42, a spheric surface serving as a light outlet 43 and directed at an angle to light inlet 42 and a reflecting surface 45 optically positioned between light inlet 42 and light outlet 43 so as to direct light from light inlet 42 to light outlet 43. In this specific embodiment, element 40 is formed as a prism and is molded from an optical quality plastic. Generally, it is understood that optical quality plastic is material having a high index of refraction, between approximately 1.5 and 1.6. Reflecting surface 45 may be a separate silvered mirror that is simply molded into element 40, or surface 45 can be silvered after formation of element 40, or surface 45 can be uncoated and used in a total internal reflection mode.

In this embodiment, light inlet 42 takes the form of an aspheric field flattening concave surface molded directly into element 40 and formed as an integral part thereof. It will be understood, however, that light inlet 42 could be formed as a separate lens and subsequently positioned in optical alignment with the lower surface of element 40. Separate components of course result in additional components and assembly steps which can increase the cost and size of the final structure.

Reflecting surface 45 is disposed, with respect to light inlet 42 and light outlet 43, to fold or bend light passing through first element 40 at an angle between approximately 80° to 100°. More specifically, in the embodiment illustrated, light is reflected at an angle of approximately 95°. It has been found, for example, that an angle of 95° avoids vignetting on the lower part of the image at the outlet of optical magnifier 32.

A significant part of the design of display 30 is the use of a solid, single fold prism with a convex outlet face to enable increased angular magnification (reduced effective focal length) in the same volume of space compared to the use of a simple turning mirror in the air.

The plurality of optical elements further includes an optical lens 47 having a light inlet, positioned adjacent light outlet 43 of first optical element 40, and a light outlet. In the specific embodiment illustrated, optical lens 47 is a biaspheric optical lens having an aspheric surface defining the light inlet and an aspheric surface defining the light outlet. Optical lens 47 is fixedly mounted relative to first element 40 by any convenient means including an outer housing (illustrated schematically in FIGS. 6–8), a mounting frame, or any other convenient structure. The aspheric surfaces, including the light outlet and inlet of optical lens 47 and light outlet 43 and field flattening light inlet 42 of element 40 are designed to reduce and/or eliminate any aberration in wavefront as it passes from light inlet 42 to the light outlet of optical lens 47.

The plurality of optical elements, including first element 40 and optical lens 47, define a light path from light inlet 42 of first element 40 to the light outlet of optical lens 47. To fabricate a single fold optical magnifier that is useful in smart card readers, the total average optical length of the optical path should be in the range of approximately 15 to 35 millimeters. In this embodiment the optical path from light inlet 42 to the aspheric surface defining the light outlet of optical lens 47 is approximately 20 millimeters.

Also, the plurality of optical elements, including first element 40 and optical lens 47, are constructed to include at least one diffractive optical element positioned in the light path so as to provide additional, primarily chromatic (in this embodiment), aberration correction. In the embodiment illustrated, a diffractive optical element 49 is incorporated into the aspheric surface defining the light inlet of optical lens 47. It will of course be understood that diffractive optical elements can, instead or in addition to, be included in any other surface of the plurality of elements in display 30. If a diffractive optical element is included in a surface that is substantially normal to the light path, as opposed to those in which the light strikes the surface at an angle, the diffractive optical element is somewhat easier to construct because of rotational symmetry, whereas surfaces on which light strikes at an angle have nonrotational symmetry. Because the aspheric surfaces and diffractive optical element 49 make lens 47 relatively complex, it has been found that fabrication of optical lens 47 is best done by injection molding.

While first element 40 and lens 47 can be constructed to form a complete magnifier, in this specific embodiment, a low power optical lens 48 is included as an example of possible extensions of the magnifier. Optical lens 48 includes a spheric surface which defines a light input and a spheric surface which defines a light output. A diffractive optical element 50 is formed in the inlet surface of lens 48 to provide additional aberration correction. Optical lens 48 is mounted adjacent optical lens 47 and forms an outlet optical element that defines an aperture through which the angularly magnified image can be viewed. The addition of optical lens 48 may add somewhat to the size and complexity of display 30, but provides some angular magnification and aberration correction that reduces the complexity of the various other elements, which can in many applications reduce the overall cost of display 30. Because of its low power, lens 48 may also be used as the package window, or viewing aperture. In applications in which only first element 40 and optical lens 47 are utilized, it may be convenient to define the viewing aperture with a glass or plastic window, which may be clear, a light filter, etc.

In many applications it may be desirable to include apparatus for focusing the final image. To this end, element 40 (and other elements 47 and 48, if desired) is mounted on substrate 36 by means of a threaded adjustment 52 which can be rotated by a thumb screw, screwdriver, etc., to move the fixed assembly of elements 40, 47 and 48 vertically toward and away from substrate 36 and apparatus 35. Focusing is accomplished by simply changing the distance between light inlet 42 and the image generated on apparatus 35.

FIG. 10 is a block diagram of a direct retinal scan display, which might also be utilized as visual display 14 of FIG. 2. A laser 60, which may be any of the well known lasers including solid state lasers, such as vertical cavity surface emitting lasers, diode lasers, diode-pumped lasers, etc., supplies a coherent light beam to a modulator 62. Modulator 62 impresses video information onto the light beam generally by modulating the intensity of the light beam as, for example, by providing changes in the power level of laser 60. Depending upon the application, the modulation could be as simple as turning laser 60 off and on, which essentially translates into a digital system. Acousto-optic modulators are one of the preferred modulators for most applications, but other techniques, such as electro-optics and mechanical are completely feasible.

The modulated light beam from modulator 62 is directed to a deflection system 63. A lens system 64 is used to focus the light beam from deflection system 63 into an eye. The focal length of lens system 64 is chosen so that the scanning system focal point is within the pupil of the eye and the coherent beam focal point is at the retina of the eye.

Timing and control of modulator 62 and deflection system 63 is provided by electronics 65. Electronics 65 includes a basic oscillator, or timer, which provides the timing signals to cause the sweeping and modulating to occur at the proper times. Also, electronics 65 provides video signals to modulator 62 to modulate the light beam to the correct intensity at the required times. Further, electronics 65 provides horizontal and vertical (orthogonal) deflection signals to cause deflection system 63 to periodically scan the light beam in a raster. Depending upon the application and the desired image resolution, the horizontal deflection frequency may be on the order of 15 to 30 kHz., the vertical deflection is no lower than 60 Hz., and the modulating frequency may be on the order of 12 MHz.

The purpose of deflection system 63 is to scan the modulated light beam on the retina of the eye, or "write" an image on the retina. There are many possible configurations for deflection system 63 and lens system 64, depending upon the application of the display and how it is desired to form the image in the eye. Additional information on this type of display is available in a copending U.S. patent application entitled "DIRECT RETINAL SCAN DISPLAY", Ser. No. 08/292,193, filed Aug. 18, 1994, assigned to the same assignee, which is a file wrapper continuation of U.S. patent application entitled "DIRECT RETINAL SCAN DISPLAY", Ser. No. 07/857,193, filed Mar. 24, 1992. While the direct retinal scan display does not technically generate a virtual image, the direct retinal scan display is included in the definition of a virtual display apparatus for purposes of this disclosure because of the similarity thereto.

Figure 11:
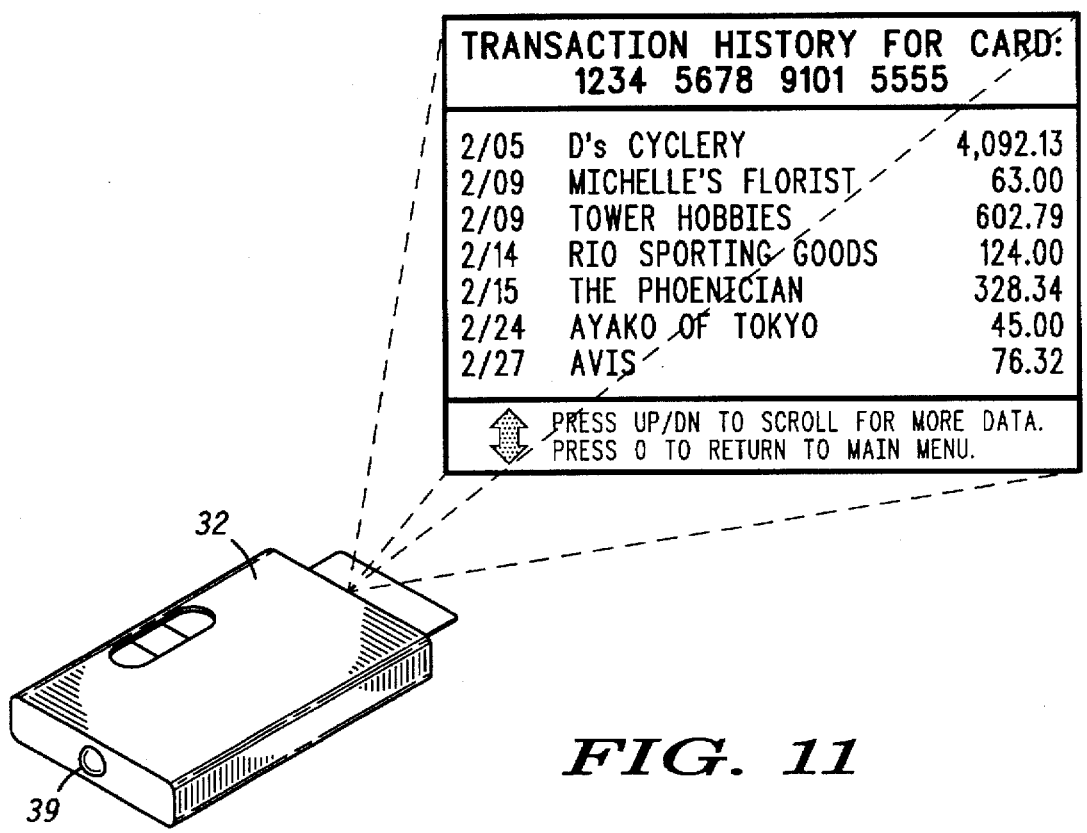
FIG. 11 is an isometric illustrating the operation of the portable smart card reader of FIG. 1.

Referring to FIG. 11, a perspective view of smart card reader 10 is illustrated with miniature virtual image display 32 mounted therein so that only viewing aperture 39 is visible. FIG. 11 further illustrates a typical view 70, or virtual image, of the information stored on smart card 13, as seen by an operator looking into viewing aperture 39 of smart card reader 10, which view 70 (virtual image) appears to be behind smart card reader 10. View 70 could appear to be as large as an 8.5 by 11 sheet of paper and could include, for example, a complete financial statement, credit card transactions and balance, medical records, etc.

Figure 12:
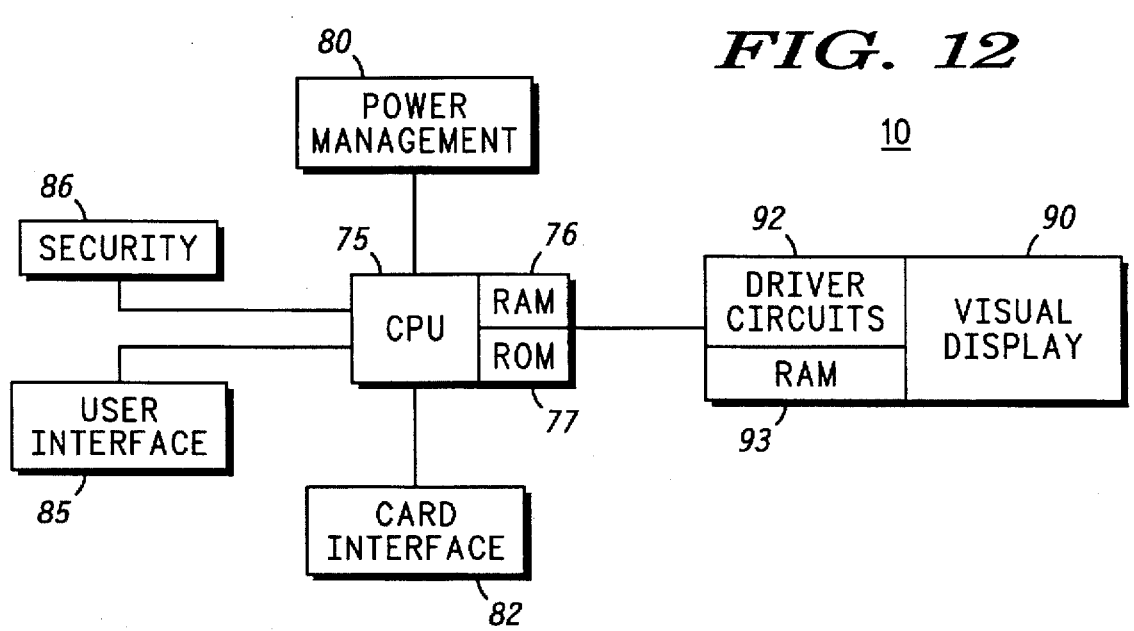
FIG. 12 is a block diagram of the portable smart card reader of FIG. 1.

Turning now to FIG. 12, a simplified block diagram of smart card reader 10 is illustrated. In this specific embodiment of smart card reader 10, a central processor unit (CPU) 75 is illustrated using a random access memory (RAM) 76 and a read only memory (ROM) 77. In this preferred embodiment an MC68HC05SC21 available commercially from MOTOROLA, INC. is utilized as CPU 75. It will of course be understood that RAM 76 and ROM 77 can be internal to CPU 75 and/or external memories can be provided for additional or specialized features. A power management circuit 80 is provided to accommodate different smart cards with different power and/or different voltage requirements (e.g. voltages in a range of 1 to 12 volts).

A card interface 82 is used to couple the smart card to CPU 75 and, as described previously, may include any or all of electrical contacts for direct physical connection, optical readers, magnetic sensors, electronic sensors (e.g. infrared sensors, RF sensors, etc. for contactless cards). In this embodiment, card interface 82 includes sensor structure 15 (FIG. 2).

A user interface 85 is provided to allow the user to communicate with CPU 75 and, ultimately, the smart card. User interface 85 includes various buttons and controls for operating visual display 14 (in this embodiment). Generally, user interface 85 includes at least an OFF/ON control and means, such as a cursor for pull-down menus, advance/reverse images, etc., to control the views being generated by visual display 14. Associated with user interface 85 is a security circuit 86 which generally will allow operation of smart card reader 10 only in response to some secret information known only to the smart card owner, e.g. a pin number, some internal circuit that matches an internal circuit of the smart card, etc. To this end, user interface 85 may include one or more buttons which must be properly operated by the user to activate smart card reader 10.

A visual display 90 includes an array of light emitting devices coupled to driver circuits 92 and a RAM 93 for storing and/or correctly orienting image data supplied by CPU 75. Generally, visual display 90 can be any of the displays described above and preferably is miniature virtual image display 30 (FIGS. 6–9). As described above, visual display 90 can include an LCD array such as that described in U.S. Pat. No. 5,486,946, entitled "Integrated Electro-optic Package for Reflective Spatial Light Modulators", issued Jan. 23, 1996 and assigned to the same assignee. Also, some typical electronics for generating an image on an array of light emitting devices is described in U.S. Pat. No. 5,432,358, entitled "Integrated Electro-optical Package", issued Jul. 11, 1995 and assigned to the same assignee.

Thus, new and improved apparatus for viewing information stored on a smart card is disclosed. The new and improved apparatus can be standardized to receive virtually any of the multiple types of smart cards and contains safe features to prevent unwarranted viewing of the information. Also, the new and improved apparatus for viewing information stored on a smart card is portable and easy to operate so that each smart card owner can easily carry an apparatus with them, if they desire, or have one at home or the office for instant apprisal of information stored on the smart card.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A smart card reader comprising:
   a portable housing including a viewing aperture;
   a virtual image display mounted in the housing and positioned to provide an image for viewing at the viewing aperture, the virtual image display including a data input terminal designed to receive image data thereon, the virtual image display further including a plurality of optical elements having a light inlet and a light outlet directed at an angle to the inlet, with a reflecting surface optically positioned between the inlet and the outlet so as to direct light from the inlet to the outlet, the plurality of optical elements include at least one aspheric surface for aberration correction, the plurality of optical elements defining a light path from the light inlet to the light outlet with a total average optical length in the range of approximately 20 to 35 millimeters, and at least one diffractive optical element positioned in the light path so as to provide further aberration correction, and the plurality of optical elements being constructed to angularly magnify an image source at the light inlet of the plurality of optical elements by greater than ten;
   sensor structure mounted in the housing and constructed to have a smart card having data stored thereon positioned adjacent thereto in data sensing juxtaposition, the sensor structure including an output terminal having sensed data thereon; and
   electronics mounted in the housing and connected to the output terminal of the sensor structure for receiving the sensed data and further connected to the input terminal of the virtual image display for supplying image data thereto.

2. A smart card reader as claimed in claim 1 wherein the virtual image display includes a two dimensional array of light emitting devices connected to provide a complete real image, the two dimensional array being coupled to the input terminal of the virtual image display for receiving the image data and generating the real image in response thereto.

3. A smart card reader as claimed in claim 2 wherein the two dimensional array of light emitting devices includes a two dimensional array of light emitting diodes.

4. A smart card reader as claimed in claim 3 wherein the two dimensional array of light emitting devices includes a two dimensional array of organic light emitting diodes.

5. A smart card reader as claimed in claim 2 wherein the two dimensional array of light emitting devices includes a two dimensional array of liquid crystal devices.

6. A smart card reader as claimed in claim 1 wherein the electronics includes a central processing unit (CPU) and a random access memory (RAM).

7. A smart card reader as claimed in claim 1 wherein the electronics includes a power management unit.

\* \* \* \* \*